(12) United States Patent
Baker

(10) Patent No.: US 10,516,863 B1
(45) Date of Patent: Dec. 24, 2019

(54) MINIATURE PORTABLE PROJECTOR DEVICE

(71) Applicant: Bradley Baker, Boise, ID (US)

(72) Inventor: Bradley Baker, Boise, ID (US)

( * ) Notice: Subject to any disclaimer, the term of this patent is extended or adjusted under 35 U.S.C. 154(b) by 0 days.

(21) Appl. No.: 16/143,868

(22) Filed: Sep. 27, 2018

(51) Int. Cl.
| | |
|---|---|
| H04N 9/31 | (2006.01) |
| G06K 9/00 | (2006.01) |
| G06F 3/02 | (2006.01) |
| H04W 4/80 | (2018.01) |
| G06F 21/32 | (2013.01) |
| F21L 4/00 | (2006.01) |
| G06F 13/42 | (2006.01) |
| G02B 27/20 | (2006.01) |

(52) U.S. Cl.
CPC ............ *H04N 9/3173* (2013.01); *F21L 4/005* (2013.01); *G02B 27/20* (2013.01); *G06F 3/02* (2013.01); *G06F 13/4282* (2013.01); *G06F 21/32* (2013.01); *G06F 2213/0042* (2013.01); *G06K 9/00006* (2013.01); *H04W 4/80* (2018.02)

(58) Field of Classification Search
CPC ...... H04N 5/63; H04N 9/3129; H04N 9/3138; H04N 9/3141; H04N 9/3173; H04N 9/3179
USPC ....... 348/744, 739, 725, 719, 716, 714, 838, 348/567, 563, 523, 376, 333.02, 231, 348/211.2, 158, 115, 113; 345/1.2, 2.2, 345/2.3, 156, 169, 173; 455/414.1, 557, 455/556.1, 566
See application file for complete search history.

(56) References Cited

U.S. PATENT DOCUMENTS

| | | | | |
|---|---|---|---|---|
| 9,756,303 | B1* | 9/2017 | De La Cruz | H04N 9/3194 |
| 2005/0020225 | A1* | 1/2005 | Lazzarotto | G06F 3/0231 |
| | | | | 455/226.1 |
| 2009/0251585 | A1* | 10/2009 | Joseph | G03B 17/00 |
| | | | | 348/333.01 |
| 2009/0251622 | A1* | 10/2009 | Mitsuhashi | H04N 9/3141 |
| | | | | 348/745 |
| 2010/0091118 | A1* | 4/2010 | Fujinawa | G03B 17/54 |
| | | | | 348/207.99 |
| 2010/0099457 | A1* | 4/2010 | Kim | G06F 1/1626 |
| | | | | 455/556.1 |
| 2010/0105428 | A1* | 4/2010 | Kim | G03B 21/14 |
| | | | | 455/556.1 |
| 2011/0085041 | A1* | 4/2011 | Kildevaeld | H04N 7/181 |
| | | | | 348/158 |

(Continued)

FOREIGN PATENT DOCUMENTS

| | | |
|---|---|---|
| CN | 202583686 | 12/2012 |
| CN | 106940510 | 7/2017 |

*Primary Examiner* — Jefferey F Harold
*Assistant Examiner* — Mustafizur Rahman
(74) *Attorney, Agent, or Firm* — Sanchelima & Associates, P.A.; Christian Sanchelima; Jesus Sanchelima

(57) ABSTRACT

The present invention is a miniature portable projector device that is compatible with multiple file types and formats, and is small enough to fit on a keychain. It comprises of at least one I/O interface to receive/transfer data to/from a data source. A format processing unit converts the received data stored in a memory into a format adapted to be projected on a surface using the optical projection imaging component, provided at one end of device. Said device also features a fingerprint scanner that allows only the authentic user to unlock the device.

4 Claims, 4 Drawing Sheets

(56) References Cited

U.S. PATENT DOCUMENTS

| | | | |
|---|---|---|---|
| 2011/0138416 A1* | 6/2011 | Kang | G06F 3/0482 |
| | | | 725/39 |
| 2012/0019643 A1* | 1/2012 | Gideon | H04N 21/25883 |
| | | | 348/77 |
| 2012/0105723 A1* | 5/2012 | van Coppenolle | G06Q 30/06 |
| | | | 348/564 |
| 2012/0214323 A1* | 8/2012 | Gore | H04N 9/3173 |
| | | | 439/212 |
| 2014/0028559 A1* | 1/2014 | Wang | G06F 3/03543 |
| | | | 345/163 |
| 2014/0307160 A1* | 10/2014 | Wheeler | G06T 5/50 |
| | | | 348/370 |
| 2015/0103131 A1* | 4/2015 | Denoue | H04N 7/147 |
| | | | 348/14.03 |
| 2017/0026607 A1* | 1/2017 | Kim | H04N 5/63 |

\* cited by examiner

MINIATURE PORTABLE PROJECTOR DEVICE

BACKGROUND OF THE INVENTION

1. Field of Invention

The present invention, in general, relates to miniature projectors. Particularly, the invention relates to a miniature portable projector device that is compatible with multiple file formats and data transfer protocols.

2. Description of the Related Art

Applicant believes that a related reference corresponds to Chinese patent application CN106940510A filed by GUANGZHOU WEIJIE TECH CO LTD. for a touch type mini-type projector. Said projector is provided with a shell body, a touch display screen, a projection unit, a camera lens, a touch signal receiving mechanism, a sound unit, a video unit, a main control chip and an internal battery, wherein the touch display screen is assembled in the shell body. However, it is not small enough to be attached to a keychain. It also does not provide any means to secure the data it stores.

Another related application is CN202583686 filed by LAI XIAOBAO for a portable mini projector with an MP4 function. It comprises a shell member wherein a projection module is arranged on the front face of the shell member, an MP4 playback module is arranged on the back face of the shell member, and a plurality of the I/O interfaces are arranged on the side faces of the shell member. However, said invention is not compatible with various file types.

Other documents describing the closest subject matter provide for a number of more or less complicated features that fail to solve the problem in an efficient and economical way. None of these patents suggest the novel features of the present invention.

SUMMARY OF THE INVENTION

It is therefore the primary objective of the invention to propose a miniature portable projector device that is compatible with multiple file types and formats, and is small enough to fit on a keychain.

It is another object of the invention to propose a miniature portable projector device that is configured to work with different OS types.

It is yet another object of the invention to provide a miniature portable projector device that is compatible with multiple wireless protocols.

It is a further object of the invention to provide a miniature portable projector device that comprises of at least one I/O interface to receive/transfer data to/from a data source. A format processing unit converts the received data stored in the memory into a format adapted to be projected on a surface using the optical projection imaging component, provided at one end of device. Said device also features a fingerprint scanner that allows only the authentic user to unlock the device.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
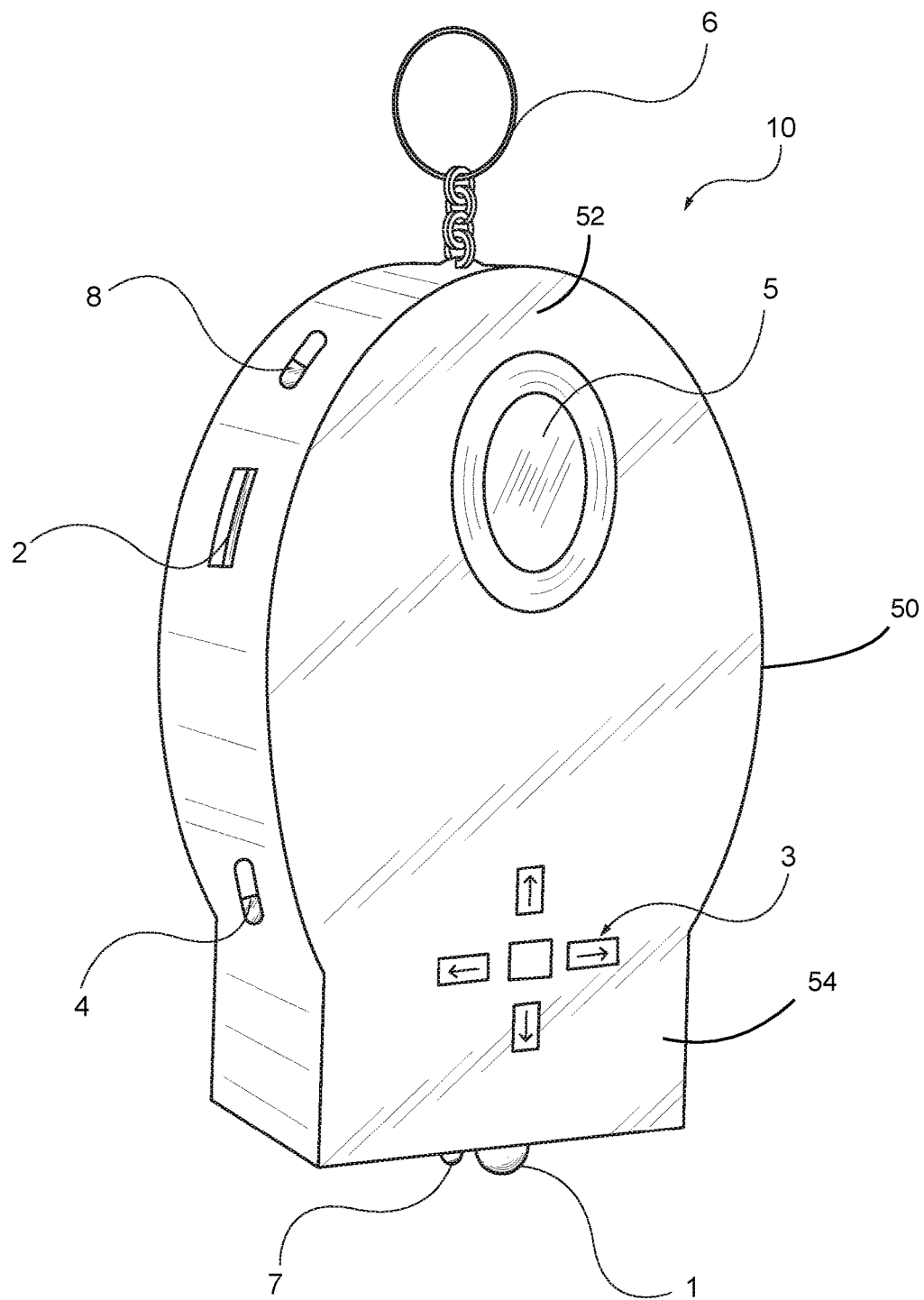
FIG. 1 represents the miniature portable projector device 10 showing the device's optical projection imaging component 1 at its end, USB port or I/O interface 2, fingerprint scanner or sensor 5, navigation switch 3 on the top part and selector switch 4 to turn on/off Bluetooth.

Referring to FIG. 1, the preferred embodiment of the present invention discloses a miniature portable projector device 10 comprising an optical projection imaging component 1 configured to casts an image of information on any surface you point it at. The device 10 comprises a a housing 50 comprising a body portion 52 and a base portion 54. Body portion 52 is elliptical in shape and base portion 54 is rectangular. The elliptical shape tapers towards base portion 54 providing a user optimal comfort when grasping device 10 for use while allowing device 10 to remain in an upright position when supported by a surface. The device 10 can be wirelessly Bluetooth connected to an electronic device, such as laptop, smartphone and the like, by operating the Bluetooth selector switch 4. The Bluetooth selector switch 4 can be housed in a communication unit to facilitate wireless transfer of data. The communication unit is a hardware component included within device 10. I/O port/interface 2 can be used to connect to the electronic device via at least one cable, for storing or retrieving data to/from device 10. The device 10 is adapted to be attached to a keychain using a hook 6 provided at its one end. Optical projection imaging component 1 can project data stored in the device 10 on a surface, when navigation button 3 are operated when required. A fingerprint scanner 5 is provided in device 10, to authentic owner to unlock the device 10. The device 10 further comprises at least one laser pointer 7 that projects small bright spot of colored light used to highlight a text or point on the surface. A switch button 8 can be used to select laser pointer option. By pushing switch button 8 from center to one end, the device 10 will project bright laser light. The laser pointer 7 can be switched off by pushing the switch button 8 back to center. The Optical projection imaging component 1 of device 10 can also be used as flashlight by pushing switch button 8 from center to other end.

Figure 2:
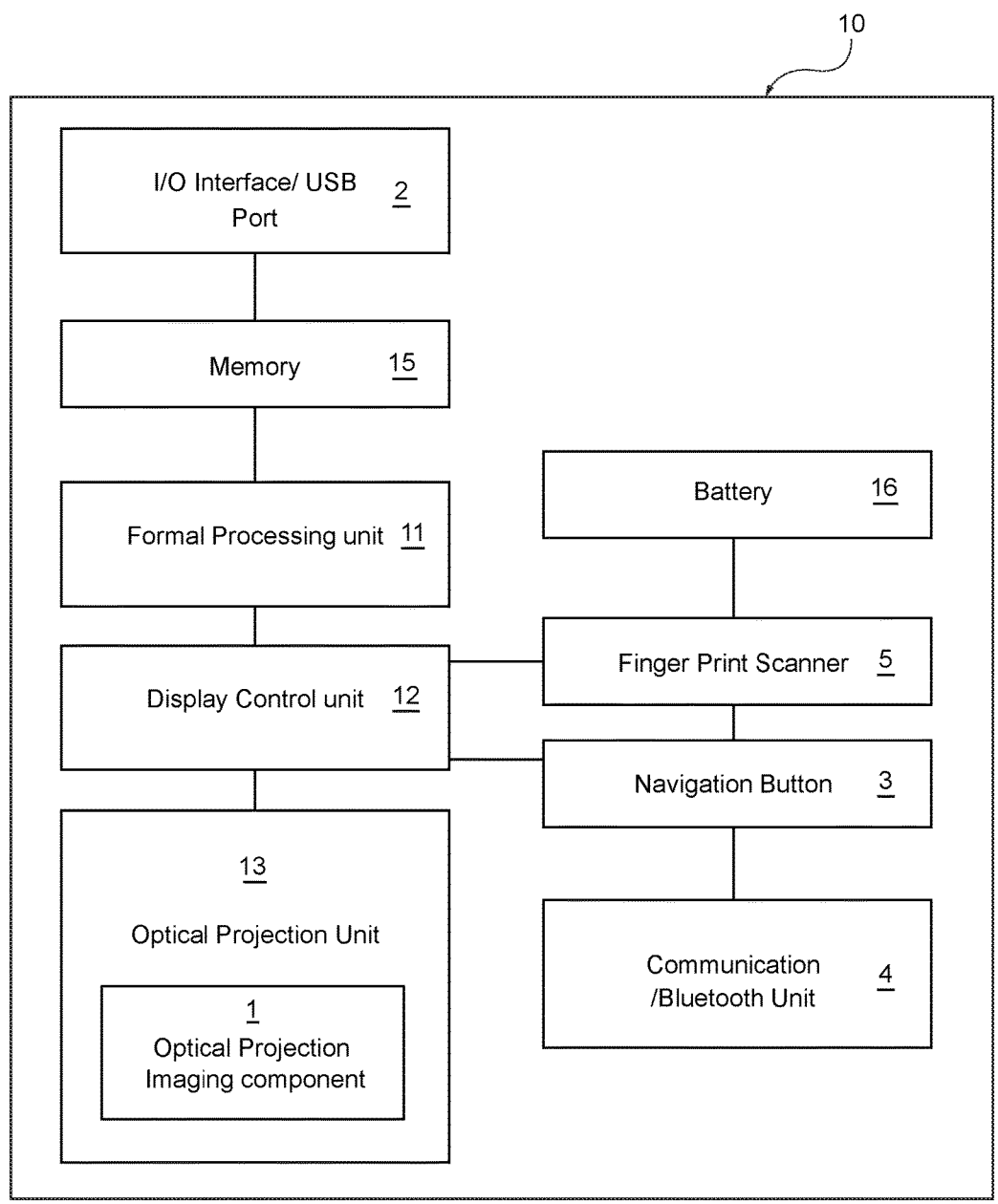
FIG. 2 represents a block diagram of operation of the miniature portable projector device 10 showing its component architecture including memory 15 to store information, format processing unit 11, display control unit 12, optical projection unit 13, battery 16, optical projection imaging component 1, fingerprint scanner 5, navigation switch 3 and Bluetooth component 4.

FIG. 2 illustrates the block diagram of operation of the device 10. An inbuilt battery 16 provides the power requirements for the operation of the projector device 10. Said battery 16 is adapted to be charged when plugged to the computer, or alternatively, from an external power source. The device 10 can store the content information in a memory or memory unit 15, either via a USD cable connecting I/O port or interface 2 of device and the electronic device (laptop or smartphone) or using the Bluetooth communication. Memory unit 15 is a hardware component such as a hard drive or a solid-state drive included within device 10. The transferred contents are acted upon by a format processing unit 11 in order to convert it into a format suitable to be projected using a optical projection unit 13. Format processing unit 11 is a hardware component included within device 10. Furthermore, optical projection unit 13 is also a hardware included within device 10. A display control unit 12 manages the data flow between format processing unit 11 and optical projection imaging component 1, wherein user selection of data and its navigation is performed by the user using a navigation button 3 provided on the device body. Display control unit 12 is a hardware component included in device 10. Clicking or long press of the center button in the navigation button 3, switches on/off the projector device 10. Without limitation, block diagram of FIG. 2 can include elements of FIG. 1 and its supporting elements, to achieve the present invention.

Figure 3:
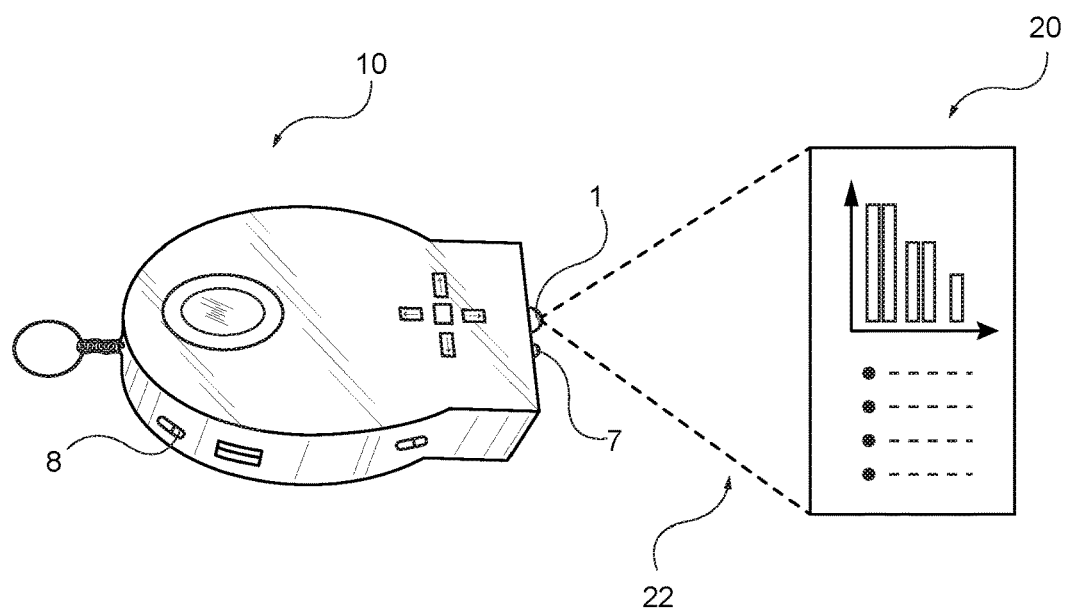
FIG. 3 represents the miniature portable projector device 10 in operation wherein it casts an image 20 of information it stores in its memory on a surface.

As depicted in FIG. 3, the image 20 of information is projected 22 using an optical projection imaging component 1 provided at one end of the device body, based on operation of navigation button 3.

Figure 4:
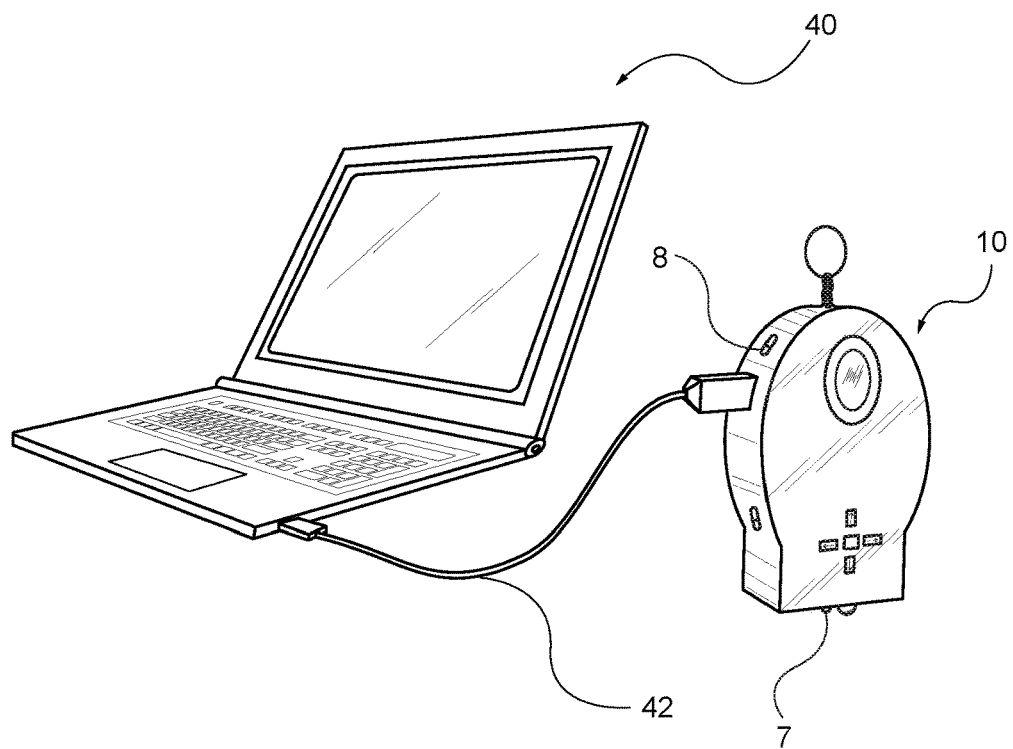
FIG. 4 is a representative view of data transfer between miniature portable projector device 10 and laptop computer 40 wherein both devices are connected using data transfer cable 42.

I/O Interface/USB port 2 of device 10 is adapted to be plugged into the USB port of a computer 40 or laptop to facilitate transfer of data/information to its memory 15, as shown in FIG. 4. Data transfer is facilitated with the aid of a proprietary software stored within memory 15 auto-installs into the computer when I/O port/interface 2 of said device 10 is plugged to its USB port using a data transfer cable 42. Said software requires the user to log in using username/password combination to access the memory contents. User can register himself the first time projector device is plugged into a computer. Required information or data is transferred manually from the computer by the user.

In the preferred embodiment, the device 10 is compatible with file types including, but not limited to, divx, mov, avid, mp4, wmv, avi, jpeg, gif, bmp, Macintosh compatible files, PPT (Power Point) slides, Microsoft documents and PDF (Portable Document Format).

Figure 5:
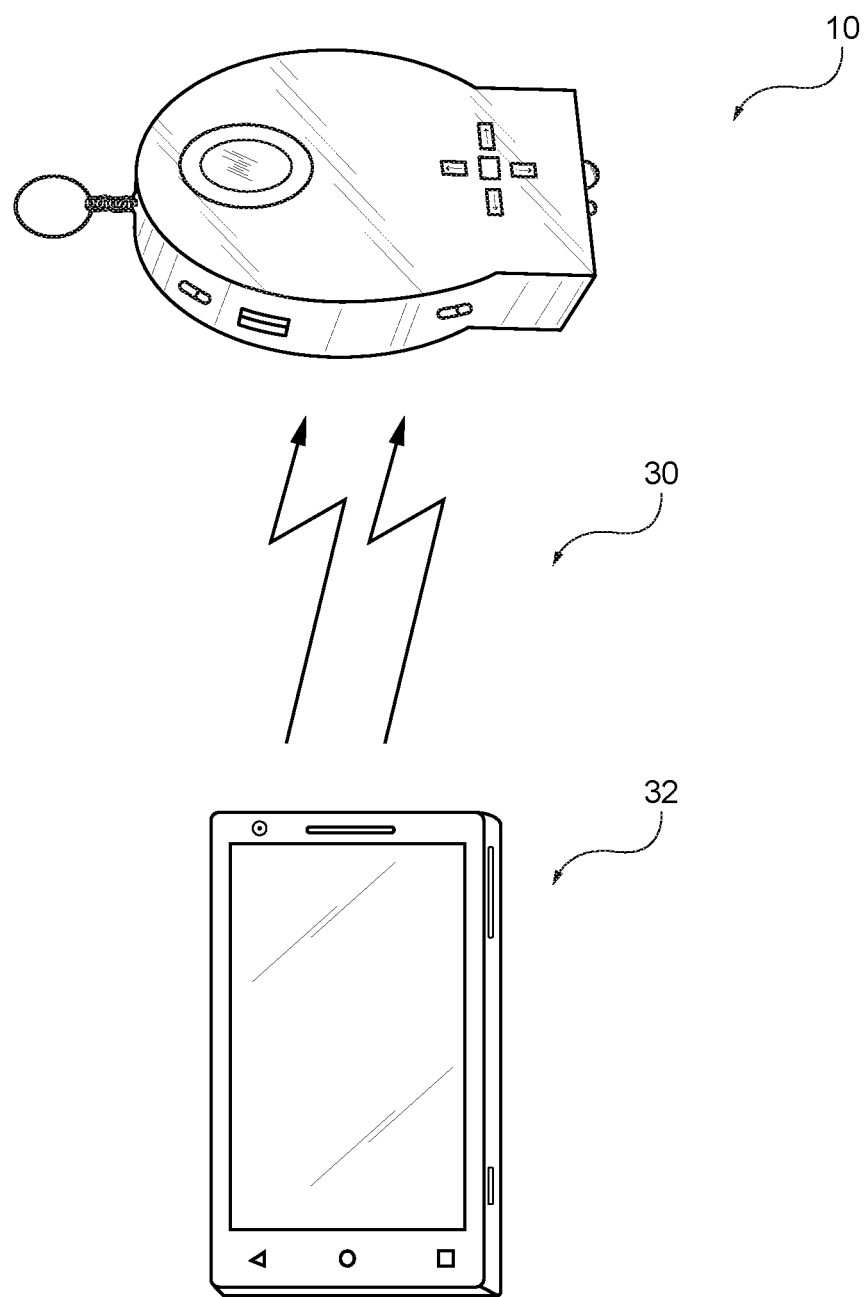
FIG. 5 is a representative view of data transfer between a smartphone 32 and miniature portable projector device 10 through Bluetooth 30.

Said device 10 is also configured to be wirelessly connected to a smartphone 32 running the proprietary software. In one embodiment, said wireless interface is Bluetooth 30. It is possible to employ WiFi (Wireless Fidelity), DLNA (Digital Living Network Alliance) and Infrared communication methods as a means for data transfer and is included within the scope of this invention. User may turn on Bluetooth in the device by flipping the Bluetooth button/selector switch 4 whereupon it will be identified by the smartphone 32 present in the vicinity. On establishing Bluetooth 30 communication between said device 10 and smartphone 32, user could transfer/send important information stored in the smartphone 32, including phone numbers, addresses, medical information and so on, to the device memory 15, as illustrated in FIG. 5.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A miniature portable projector device compatible with multiple file types, said device comprising of:
   a housing comprising a body portion and a base portion, said body portion being elliptical in shape and said base portion being rectangular, said elliptical shape tapering towards said base portion provides a user optimal comfort when grasping said device for use while allowing the device to remain in an upright position when supported by a surface;
   at least one I/O interface to receive/transfer data to/from a data source;
   memory unit to store data;
   a format processing unit to convert received data into desired format;
   optical projection unit comprising optical projection imaging component configured to project information on to a surface;
   a display control unit interfacing format processing unit and optical projection imaging component, wherein user selection of data is performed using a navigation button provided on said body, said control unit having at least five navigation buttons located near the bottom end of said body, said navigation buttons having an illustration of arrows, said arrows aid a user in navigating the information stored within said memory unit to be projected onto a surface;
   communication unit to facilitate wireless transfer of data; and
   a fingerprint sensor configured to unlock the device.

2. The miniature portable projector device of claim 1, wherein optical projection unit also acts as flashlight.

3. The miniature portable projector device of claim 1 further comprises at least one laser pointer to point information on surface.

4. A miniature portable projector device compatible with multiple file types, said device comprising of:
   at least one I/O interface to receive/transfer data to/from a data source;
   memory unit to store data;
   a format processing unit to convert received data into desired format;
   optical projection unit comprising optical projection imaging component configured to project information on to a surface;
   display control unit interfacing format processing unit and optical projection imaging component, wherein user selection of data is performed using a navigation button provided on the device body;
   communication unit to facilitate wireless transfer of data;
   fingerprint sensor configured to unlock the device; and
   at least one laser pointer to point information on surface, optical projection unit is a flashlight;
   a laser pointer is mounted to said device, said device includes a base portion that is rectangular and tapers into a body portion that is elliptical, said base portion includes a bottom surface;
   said body portion includes a top distal end; and
   a keychain that extends from said body portion distal end;
   wherein said optical projection unit and said laser pointer extend only from said base bottom surface away from said keychain.

* * * * *